United States Patent [19]
Blankenship et al.

[11] Patent Number: 6,020,435
[45] Date of Patent: Feb. 1, 2000

[54] PROCESS FOR PREPARING POLYMER CORE SHELL TYPE EMULSIONS AND POLYMERS FORMED THEREFROM

[75] Inventors: Robert Mitchell Blankenship, Harleysville; James Keith Bardman, Green Lane, both of Pa.

[73] Assignee: Rohm and Haas Company, Philadelphia, Pa.

[21] Appl. No.: 08/974,763

[22] Filed: Nov. 20, 1997

Related U.S. Application Data

[60] Provisional application No. 60/064,513, Nov. 5, 1997.
[51] Int. Cl.$^7$ ........................................................ C08F 4/00
[52] U.S. Cl. ........................... 525/256; 525/263; 525/301; 525/902
[58] Field of Search ..................................... 525/309, 244, 525/301, 264, 263, 256, 261

[56] References Cited

U.S. PATENT DOCUMENTS

| | | | |
|---|---|---|---|
| 4,427,836 | 1/1984 | Kowalski et al. | 525/301 |
| 4,468,498 | 8/1984 | Kowalski et al. | 525/301 |
| 4,594,363 | 6/1986 | Blankenship et al. | 521/68 |
| 5,360,827 | 11/1994 | Toda et al. | 521/57 |
| 5,494,971 | 2/1996 | Blankenship | 525/301 |
| 5,521,253 | 5/1996 | Lee et al. | 525/301 |
| 5,639,805 | 6/1997 | Park | 523/201 |

FOREIGN PATENT DOCUMENTS

| | | |
|---|---|---|
| WO 95/11265 | 4/1995 | WIPO . |

*Primary Examiner*—Christopher Henderson
*Attorney, Agent, or Firm*—Wendy A. Choi

[57] ABSTRACT

A process for preparing multi-stage emulsion polymers is provided. The process is capable of producing multi-stage emulsion polymers having low dry-bulk density. These polymers are useful in coating compositions such as paints and paper coatings.

5 Claims, No Drawings

PROCESS FOR PREPARING POLYMER CORE SHELL TYPE EMULSIONS AND POLYMERS FORMED THEREFROM

This application claims benefit of Provisional Application 60/064,513 filed Nov. 5, 1997.

The present invention relates to processes for preparing polymer emulsions and polymers formed therefrom. In particular, the present invention relates to aqueous emulsion polymerization processes for preparing polymer emulsions and emulsion polymers formed therefrom.

"Emulsion polymer", as used herein, refers to a water-insoluble polymer which is prepared by emulsion polymerization techniques.

"Polymer emulsion", as used herein, refers to an aqueous composition having discrete, water-insoluble polymer particles dispersed therein.

As used herein, acrylate and methacrylate are referred to as "(meth)acrylate," acrylic acid and methacrylic acid are referred to as "(meth)acrylic acid."

Emulsion polymers, such as hollow or voided emulsion polymers, are known for use in several industrial applications. The literature uses the terms "hollow" and "voided" interchangeably. These polymers are often used in paints, coatings, inks, sunscreens and paper manufacture. Hollow emulsion polymers are generally prepared by swelling a core/shell emulsion polymer in such a way that one or more voids form in the interior of the emulsion polymer particle. These voids contribute, among other things, to the opacity of coatings and films prepared with the hollow emulsion polymer.

For some applications, it is particularly desirable to minimize the weight of the coating applied. For example, it is desirable for certain paper coatings applications to have a high performance coating without adding considerably to the weight of the paper.

Accordingly, it is desirable to provide lightweight, low density additives for coatings, such as voided latex particles.

Voided latex particles can be prepared by any of several known process, including those described U.S. Pat. Nos. 4,427,836, 4,468,498, 4,594,363, 4,880,842, 5,494,971, 5,521,253, 5,157,084, 5,360,827 among others. Voided latex particles, as described in the references noted above, are prepared by swelling the core of a core-shell emulsion polymer. Some of the processes, such as that described by U.S. Pat. No. 5,360,827 describe the processes whereby, in the latter stages of polymerizing the shell, monomer is added to facilitate diffusion of base into the core of the polymer in order to achieve swelling. Then, the pH of the emulsion is adjusted with a carboxyl-group containing monomer which is subsequently polymerized. However, this process is time consuming and does not result in suitable lightweight emulsion polymers.

The present invention seeks to overcome the deficiencies in the previously known processes by providing low density voided emulsion polymers and a process for preparing them.

In a first aspect of the present invention, there is provided a process for preparing emulsion polymer particles comprising:

a) providing an aqueous emulsion of
i) multi-stage emulsion polymer, comprising a core stage polymer and a shell stage polymer,
wherein the core stage polymer comprises, as polymerized units, from 5 to 100 percent by weight, based on the weight of the core stage polymer, of hydrophilic monoethylenically unsaturated monomer, and from 0 to 95 percent by weight, based on the weight of the core stage polymer, of at least one nonionic monoethylenically unsaturated monomer; and
wherein the shell stage polymer comprises, as polymerized units, at least 50 percent by weight of nonionic monoethylenically unsaturated monomer;
ii) monomer at a level of at least 0.5 percent by weight based on the weight of the multi-stage emulsion polymer; and
iii) swelling agent
under conditions wherein there is no substantial polymerization of the monomer; and
b) reducing the level of monomer by at least fifty percent.

In a second aspect of the present invention, there is provided an aqueous polymer emulsion comprising water and swollen multi-stage emulsion polymer wherein the dry bulk density of the swollen multi-stage emulsion is: less than 0.77 grams per cubic centimeter ("g/cc") when the swollen multi-stage emulsion polymer has a particle size below 275 nanometers ("nm"); less than 0.74 g/cc when the swollen multi-stage emulsion polymer has a particle size of from 275 to 500 nm; less than 0.59 g/cc when the swollen multi-stage emulsion polymer has a particle size of from 501 to 750 nm; less than 0.46 g/cc when the swollen multi-stage emulsion polymer has a particle size of from 751 to 1300 nm.

The stages of the multi-stage polymers of the present invention include core stage polymer (the "core"), and shell stage polymer (the "shell"). The core and shell may themselves be comprised of more than one stage. There may also be one or more intermediate stages. Preferably, the multi-stage polymer comprises a core, an intermediate layer and a shell.

The cores of the multi-stage polymers of the present invention are emulsion polymers comprising, as polymerized units, from 5 to 100 percent by weight, based on the weight of the core, of at least one hydrophilic monoethylenically unsaturated monomer and from 0 to 95 percent by weight, based on the weight of the core stage polymer, of at least one nonionic monoethylenically unsaturated monomer.

Cores containing at least five percent by weight, based on the total weight of the core polymer, of at least one hydrophilic monoethylenically unsaturated monomer will generally result in a suitable degree of swelling. There may be instances wherein, because of the hydrophobicity of certain comonomers or combinations thereof in conjunction with the hydrophobic/hydrophilic balance of a particular hydrophlic monomer, the copolymer may be suitably prepared with less than five percent by weight, based on the total weight of the core polymer, of a hydrophilic monoethylenically unsaturated monomer. Preferably, the core comprises, as polymerized units, hydrophilic monoethylenically unsaturated monomer at a level of from 5 to 100, more preferably, from 20 to 60, and most preferably, from 30 to 50 percent by weight based on the total weight of the core. The hydrophilic core polymer may be made in a single stage or step of the sequential polymerization or may be made by a plurality of steps in sequence.

The multi-stage emulsion polymer of the present invention contemplates a core polymer wherein at least one hydrophilic monoethylenically unsaturated monomer is polymerized alone or with at least one nonionic monoethylenically unsaturated monomer. This process also contemplates, and includes in the term "hydrophilic monoethylenically unsaturated monomer," the use of a nonpolymeric compound containing at least one carboxylic acid group which absorbed into the core polymer before, during or after the polymerization of the hydrophobic shell polymer as a replacement for the hydrophilic monoethylenically unsaturated monomer in the hydrophilic core polymer, as described in U.S. Pat. No. 4,880,842. In addition, this invention contemplates, and includes in the term "hydrophilic monoethylenically unsaturated monomer," the use of a latent hydrophilic core polymer which contains no hydrophilic monoethylenically unsaturated monomer but which is swellable upon hydrolysis to a hydrophilic core polymer as described in U.S. Pat. No. 5,157,084.

Suitable hydrophilic monoethylenically unsaturated monomer useful for making the core polymer include monoethylenically unsaturated monomers containing acid-functionality such as monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like. Acrylic acid and methacrylic acid are preferred.

Suitable nonpolymeric compounds containing at least one carboxylic acid group include $C_6$–$C_{12}$ aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like.

Suitable nonionic monoethylenically unsaturated monomers for making the hydrophilic core polymer include styrene, a-methyl styrene, p-methyl styrene, t-butyl styrene, vinyltoluene, ethylene, vinyl acetate, vinyl chloride, vinylidene chloride, (meth)acrylonitrile, (meth)acrylamide, ($C_1$–$C_{20}$) alkyl or ($C_3$–$C_{20}$) alkenyl esters of (meth)acrylic acid, such as methyl (meth)acrylate, ethyl (meth)acrylate, butyl (meth)acrylate, 2-ethylhexyl (meth)acrylate, hydroxyethyl(meth)acrylate, hydroxypropyl(meth)acrylate, benzyl (meth)acrylate, lauryl (meth)acrylate, oleyl (meth)acrylate, palmityl (meth)acrylate, stearyl (meth)acrylate and the like.

The core, whether obtained by a single stage process or a process involving several stages, has an average particle size of from 50 nm to 1.0 micron, preferably from 100 nm to 300 nm, diameter in unswollen condition. If the core is obtained from a seed polymer, the seed polymer preferably has an average particle size of from 30 nm to 200 nm.

The core may also optionally contain less than 20 percent by weight, preferably from 0.1 to 3 percent by weight, based on the total weight of the core, of polyethylenically unsaturated monomer, wherein the amount used is generally approximately directly proportional to the amount of hydrophilic monoethylenically unsaturated monomer used; in other words, as the relative amount of hydrophilic monomer increases, it is acceptable to increase the level of polyethylenically unsaturated monomer. Alternatively, the core polymer may contain from 0.1 to 60 percent by weight, based on the total weight of the core polymer, of butadiene.

Suitable polyethylenically unsaturated monomers include comonomers containing at least two addition polymerizable vinylidene groups and are alpha beta ethylenically unsaturated monocarboxylic acid esters of polyhydric alcohols containing 2–6 ester groups. Such comonomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth) acrylates; dicyclopentenyloxy (meth)acrylates; unsaturated esters of glycol monodicyclopentenyl ethers; allyl esters of α,β-unsaturated mono- and dicarboxylic acids having terminal ethylenic unsaturation including allyl methacrylate, allyl acrylate, diallyl maleate, diallyl fumarate, diallyl itaconate and the like.

The multi-stage polymer of the present invention preferably contains an intermediate stage. The intermediate stage polymer, when present, partially or fully encapsulates the core and itself is partially or fully encapsulated by the shell. The intermediate stage is prepared by conducting an emulsion polymerization in the presence of the core.

The intermediate stage preferably contains, as polymerized units, from 0.3 to 20, more preferably from 0.5 to 10 percent by weight, based on the weight of the core, of at least one hydrophilic monoethylenically unsaturated monomer. The intermediate stage preferably contains, as polymerized units, from 80 to 99.7, more preferably from 90 to 99.5 percent by weight, based on the weight of the intermediate stage, of at least one nonionic monoethylenically unsaturated monomer. The hydrophilic monoethylenically unsaturated monomers and the nonionic monoethylenically unsaturated monomers useful for making the core are also useful for making the intermediate layer.

The shell of the multi-staged polymer of this invention is the product of emulsion polymerizing from 80 to 100, preferably from 90 to 100, percent by weight, based on the total weight of the shell, of at least one nonionic monoethylenically unsaturated monomer. The nonionic monoethylenically unsaturated monomers suitable for the core are also suitable for the shell. Styrene is preferred.

The shell may also contain, as polymerized units, from 0 to 20, preferably from 0 to 10, percent by weight based on the weight of the shell, of one or more monoethylenically unsaturated monomers containing acid-functionality for making the hydrophobic polymer shell include acrylic acid, methacrylic acid, acryloxypropionic acid, (meth) acryloxypropionic acid, itaconic acid, aconitic acid, maleic acid, maleic anhydride, fumaric acid, crotonic acid, monomethyl maleate, monomethyl fumarate, monomethyl itaconate and the like. Acrylic acid and methacrylic acid are preferred.

The monomers used and the relative proportions thereof in the shell should be such that it is permeable to an aqueous or gaseous volatile or fixed basic swelling agent capable of swelling the core. Monomeric mixtures for making the shell preferably contain from about 0.1% by weight to about 10% by weight, based on the total weight of the shell polymer, of an acid-functional monoethylenically unsaturated monomer. Preferably, the proportion of acid-functional monoethylenically unsaturated monomer in the shell polymer does not exceed one-third the proportion thereof in the core polymer.

The presence of acid-functional monoethylenically unsaturated monomer in the shell polymer may serve several functions:

(1) stabilizing of the final multi-stage emulsion polymer;
(2) assuring permeability of the shell to a swelling agent; and
(3) compatibilizing the shell with the previously formed stage of the multistage emulsion polymer.

As used herein, the term "sequentially emulsion polymerized" or "sequentially emulsion produced" refers to polymers (including homopolymers and copolymers) which are prepared in aqueous medium by an emulsion polymerization process in the presence of the dispersed polymer particles of a previously formed emulsion polymer such that the previously formed emulsion polymers are increased in size by deposition thereon of emulsion polymerized product of one or more successive monomer charges introduced into the medium containing the dispersed particles of the preformed emulsion polymer.

In the sequential emulsion polymerization with which the present invention is concerned, the term "seed" polymer is used to refer to an aqueous emulsion polymer dispersion which may be the initially-formed dispersion, that is, the product of a single stage of emulsion polymerization or it may be the emulsion polymer dispersion obtained at the end of any subsequent stage except the final stage of the sequential polymerization. Thus, a hydrophilic core polymer which is herein intended to be encapsulated by one or more subsequent stages of emulsion polymerization may itself be termed a seed polymer for the next stage.

The method of this invention contemplates that the core, the intermediate stage, the shell, or any combination thereof may be made in a single stage or step of the sequential polymerization or may be made by a plurality of steps in sequence following the polymerization. The first stage of emulsion polymerization in the process of the present invention may be the preparation of a seed polymer containing small dispersed polymer particles insoluble in the aqueous emulsion polymerization medium. This seed polymer may or may not contain any hydrophilic monomer component but provides particles of minute size which form the nuclei on which the hydrophilic core polymer, with or without nonionic comonomer, is formed.

A water-soluble free radical initiator is utilized in the aqueous emulsion polymerization. Suitable water-soluble free radical initiators include hydrogen peroxide; tert-butyl peroxide; alkali metal persulfates such as sodium, potassium and lithium persulfate; ammonium persulfate; and mixtures of such initiators with a reducing agent. Reducing agents include: sulfites, such as alkali metal metabisulfite, hydrosulfite, and hyposulfite; sodium formaldehyde sulfoxylate; and reducing sugars such as ascorbic acid and isoascorbic acid. The amount of initiator is preferably from 0.01 to 3 percent by weight, based on the total amount of monomer and in a redox system the amount of reducing agent is preferably from 0.01 to 3 percent by weight based on the total amount of monomer. The temperature may be in the range of about 10° C. to 100° C. In the case of the persulfate systems, the temperature is preferably in the range of 60° C. to 90° C. In the redox system, the temperature is preferably in the range of 30° C. to 70° C., preferably below about 60° C., more preferably in the range of 30° C. to 45° C. The type and amount of initiator may be the same or different in the various stages of the multi-stage polymerization.

One or more nonionic or anionic emulsifiers, or surfactants, may be used, either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(l)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$–$C_{16}$)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate. The one or more surfactants are generally used at a level of from 0 to 3 percent based on the weight of the multi-stage polymer. The one or more surfactants can be added prior to the addition of any monomer charge, during the addition of a monomer charge or a combination thereof. In certain monomer/emulsifier systems for forming the shell, the tendency to produce gum or coagulum in the reaction medium may be reduced or prevented by the addition of about 0.05% to about 2.0% by weight, based on total weight of the shell polymer, of emulsifier without detriment to the deposition of the polymer formed on the previously formed core particles.

The amount of emulsifier may be zero, in the situation wherein a persulfate initiator is used, to 3 percent by weight, based on the weight of total weight of the core polymer. By carrying out the emulsion polymerization while maintaining low levels of emulsifier, the subsequent stages of polymer-formation deposit the most-recently formed polymer on the existing dispersed polymer particles resulting from the preceding step or stage. As a general rule, the amount of emulsifier should be kept below that corresponding to the critical micelle concentration for a particular monomer system, but while this limitation is preferable and produces a unimodal product, it has been found that in some systems the critical micelle concentration of the emulsifier may be exceeded somewhat without the formation of an objectionable or excessive number of dispersed micelles or particles. It is for the purpose of controlling the number of micelles during the various stages of polymerization so that the deposition of the subsequently formed polymer in each stage occurs upon the dispersed micelles or particles formed in the previous stages, that the concentration of emulsifier is kept low.

The viscosity- average molecular weight of the polymer formed in a given stage may range from 100,000, or lower if a chain transfer agent is used, to several million molecular weight. When 0.1% by weight to 20% by weight, based on the weight of the monomer, of a polyethylenically unsaturated monomer mentioned hereinbefore is used in making the core, the molecular weight is increased whether or not crosslinking occurs. The use of the polyethylenically unsaturated monomer reduces the tendency of the core polymer to dissolve when the multistaged polymer is treated with a swellant for the core. If it is desired to produce a core having a molecular weight in the lower part of the range, such as from 500,000 down to as low as about 20,000, it is frequently most practical to do so by avoiding the polyethylenically unsaturated monomers and using a chain transfer agent instead, such as 0.05% to 2% or more thereof, examples being alkyl mercaptans, such as sec-butyl mercaptan.

The weight ratio of core to the intermediate stage, if present, is generally in the range of from 1:0.5 to 1:10, preferably in the range of from 1:1 to 1:7. The weight ratio of core to shell is generally in the range of from 1:5 to 1:20, preferably in the range of from 1:8 to 1:15. When trying to decrease the dry density of the final product, is preferred to have as little shell as possible while still encapsulating the core.

The amount of polymer deposited to form shell polymer is generally such as to provide an overall size of the multistage polymer particle of from 70 nm to 4.5 microns, preferably from 100 nm to 3.5 microns, more preferably from 200 nm to 2.0 microns, in unswollen condition (that is, before any neutralization to raise the pH to about 6 or higher) whether the shell polymer is formed in a single stage or in a plurality of stages. In order to minimize the dry density of the final product, it is preferable to deposit only as much shell polymer as is needed to fully encapsulate the core. When the hydrophilic core polymer is fully encapsulated, it does not titrate with alkali metal bases under normal analytical conditions of about 1 hour and at room temperature. The extent of encapsulation can be determined by removing samples during the course of the shell polymerization and titrating with sodium hydroxide.

The multi-stage emulsion polymer is prepared by sequential emulsion polymerization, which, as discussed above, includes charging the monomers which form the shell. At, or near, the conclusion of charging the monomers which form the shell, the contents of the reactor include the multistage polymer, water and unreacted monomer. Under the conditions of an emulsion polymerization, there is also an appreciable free-radical content, or radical flux, which keeps the polymerization process going. Even if no additional monomer or initiator is added, there is an appreciable free-radical content in the system. When there is no appreciable free-radical content, in other words, when the radical flux is very low or approaches zero, then no substantial amount of polymerization will occur.

We have discovered that this free-radical content interferes with the extent of swelling which can be achieved. Previously known processes typically achieve swelling by adding a suitable swelling agent in the latter stages of charging the monomers which form the shell or at the completion of charging the monomers which form the shell. It is believed that the presence of unreacted monomer facilitates the transport of the swelling agent to the core. However, in previously known processes, the swelling agent was added to the system while there was still an appreciable free-radical content in the system. Thus, under those conditions, a substantial amount of polymerization was still occurring.

We have discovered that by providing an aqueous emulsion of the multi-stage emulsion polymer, monomer and swelling agent under conditions wherein there is no substantial polymerization of the monomer, we can enhance the extent of swelling of the multistage emulsion polymer.

There are many means for providing that no substantial polymerization of monomer is occurring, including the addition of one or more polymerization inhibitors, the addition of one or more reducing agents, waiting for a sufficient period of time until there are no longer an appreciable number of free-radicals by virtue of them terminating, cooling the contents of the reactor to limit the reactivity of the free-radicals, and combinations thereof. A preferred means involves the addition of one or more polymerization inhibitors such as, for example, N,N-diethylhydroxylamine, N-nitrosodiphenylamine, 2,4-dinitrophenylhydrazine, p-phenylenediamine, phenathiazine, alloocimene, triethyl phosphite, 4-nitrosophenol, 2-nitrophenol, p-aminophenol, 4-hydroxy-TEMPO (also known as 4-hydroxy-2,2,6,6, tetramethylpiperidinyloxy, free radical), hydroquinone, p-methoxyhydroquinone, tert-butyl-p-hydroquinone, 2,5-di-tert-butyl-p-hydroquinone, 1,4-naphthalenediol, 4-tert butyl catechol, copper sulfate, copper nitrate, cresol and phenol. When used, the polymerization inhibitors or reducing agents are added in effective amount to substantially stop any polymerization, generally from 25 to 5,000 parts per million ("ppm"), preferably from 50 to 3,500 ppm based on polymer solids. Preferably, the polymerization inhibitor(s) or reducing agent(s) are added while the multistage polymer is at or below the temperature at which the shell was polymerized, most preferably within ten degrees Celsius below the temperature at which the shell was polymerized.

Monomer which is present at, or after providing that no substantial polymerization of monomer is occurring can be (i) one or more of the monomers used to prepare any of the stages of the multistage polymer, (ii) one or more monomers other than those use to prepare any of the stages of the multistage polymer, or (iii) combinations thereof. Preferably, monomer present at such time is one or more of the monomers used to prepare the shell. Such monomer may be unreacted monomer from preparing the multi-stage emulsion polymer, it may be separately added, or a combination thereof. Preferably, the monomer is nonionic monomer. Nonionic monomer is preferred because acid-functional monomers will be neutralized by the swelling agent, and these neutralized monomers are difficult to remove by polymerization. Preferably the level of monomer present at, or after providing that no substantial polymerization of monomer is occurring is from 1 to 20 times as much as the standing monomer level during polymerization.

It is also necessary to use one or more swelling agents. Suitable swelling agents include, are those which, in the presence of the multistage emulsion polymer and monomer, are capable of permeating the shell and swelling the core. Swelling agents may be aqueous or gaseous, volatile or fixed bases or combinations thereof.

Suitable swelling agents include volatile bases such as ammonia, ammonium hydroxide, and volatile lower aliphatic amines, such as morpholine, trimethylamine, and triethylamine, and the like; fixed or permanent bases such as potassium hydroxide, lithium hydroxide, zinc ammonium complex, copper ammonium complex, silver ammonium complex, strontium hydroxide, barium hydroxide and the like. Solvents, such as, for example, ethanol, hexanol, octanol, Texanol® solvent and those described in U.S. Pat. No. 4,594,363, may be added to aid in fixed or permanent base penetration. Ammonia and ammonium hydroxide are preferred.

When trying to maximize the extent of swelling, it is preferable that the one or more swelling agents are added after providing that no substantial polymerization of monomer is occurring. The amount of swelling agent can be less than, equal to or greater than the amount needed to provide for complete neutralization of the core. Preferably, the amount of swelling agent is in the range of from 75 to 300 percent, more preferably in the range of from 90 to 250 percent based on the equivalents of the functionality in the core capable of being neutralized. It is also preferable to add the one or more swelling agents to the multistage emulsion polymer while the multistage emulsion polymer is at an elevated temperature, preferably at a temperature within 10° C. of the shell polymerization temperature. Swelling is generally very efficient under conditions of elevated temperature, in the presence of monomer and no substantial polymerization occurring. Under these conditions, swelling is generally complete within 30 minutes, preferably within 20 minutes, most preferably within 10 minutes of adding the one or more swelling agents.

The core polymer of the multistage emulsion polymer swells when the core is subjected to a basic swelling agent that permeates the shell to at least partially neutralize the hydrophilic-functionality of the core, preferably to a pH of at least about 6 to at least about 10, and thereby result in swelling by hydration of the hydrophilic core polymer. The swelling, or expansion, of the core may involve partial merging of the outer periphery of the core into the pores of the inner periphery of the shell and also partial enlargement or bulging of the shell and the entire particle overall.

When the swollen multistage emulsion polymer is dried, water and/or swelling agent are removed from the central region of the swollen multistage emulsion polymer, the core tends to shrink and a void develops, the extent of which depends upon the resistance of the shell to restoration to its previous size. This resistance of the shell restoring itself to its previous size is critical for minimizing the dry bulk density of the swollen multistage emulsion polymer. The expansion of the core results in expansion of the shell also. As the size of the shell is restored to its previous size, the dry bulk density increases. It is desirable, therefore, to minimize the extent to which the size of the shell is restored, thereby maximizing the dry bulk density of the swollen multistage emulsion polymer.

This can be accomplished by reducing the monomer level. It is believed that the presence of monomer is helpful in facilitating the swelling of the multistage polymer, whether by plasticizing the shell, aiding in the transport through the shell or a combination thereof. However, the presence of monomer is detrimental when trying to maximize swelling and minimize the dry bulk density of the swollen multistage emulsion polymer. Accordingly, after swelling the multistage emulsion polymer in the presence of both monomer and swelling agent, it is desirable to reduce the level of monomer to less than 10,000 ppm, preferably to less than 5,000 ppm based on polymer solids. This can be accomplished by any suitable means. Preferably, the level of monomer is reduced by polymerizing the monomer. This can be accomplished by any suitable means, such as by adding one or more initiators such as those recited above. It is preferred to begin to reduce the level of monomer within 20 minutes, more preferably within 10 minutes, of adding the one or more swelling agents.

The process of the present invention is capable of producing swollen multi-stage emulsion polymers having very low bulk density. Swollen emulsion multi-stage polymers having an a particle size below 275 nm can be prepared with a dry bulk density of from 0.30 to 0.77 g/cc, preferably from 0.35 to 0.76 g/cc, most preferably from 0.40 to 0.75 g/cc. Swollen emulsion multi-stage polymers having an a particle size in the range of from 275 to 500 nm can be prepared with a dry bulk density of from 0.30 to 0.74 g/cc, preferably from 0.35 to 0.73 g/cc, most preferably from 0.40 to 0.72 g/cc. Swollen emulsion multi-stage polymers having an a particle size in the range of from 501 to 750 nm can be prepared with a dry bulk density of from 0.30 to 0.59 g/cc, preferably from 0.35 to 0.58 g/cc, most preferably from 0.40 to 0.57 g/cc. Swollen emulsion multi-stage polymers having an a particle size in the range of from 751 to 1,300 nm can be prepared with a dry bulk density of from 0.30 to 0.46 g/cc, preferably from 0.35 to 0.45 g/cc, most preferably from 0.40 to 0.44 g/cc.

When the swollen multistage emulsion polymers are at least partially dried to produce voided polymer particles, these voided polymer particles impart favorable properties, such as gloss, brightness and opacity to paper coating formulations to which they are added.

The voided latex particles produced by the method of the present invention are useful in coating compositions, such as aqueous-based paint and paper coatings. The voided polymer particles produced by the method of this invention impart improved gloss, brightness and opacity to paper coating formulations to which they are added. Also, the voided polymer particles produced by the method of this invention impart opacity to aqueous coating compositions, such as paints, to which they are added.

EXAMPLE 1

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 6.5 grams of sodium dodecylbenzenesulfonate (SDS, 23%), 10.0 grams of methacrylic acid, and 780.0 grams of methyl methacrylate. From this ME, 164 grams were removed and set aside. To the remaining ME was added 71.2 grams of SDS (23%) and 510 grams of methacrylic acid. With the kettle water at 86° C., a mixture of 160 grams of deionized water, 10.4 grams of SDS (23%), and 20.5 grams of Plurafac® B-25-5 (Plurafac is a trademark of BASF), followed by the ME removed from the initial ME, followed by a mixture of 5.5 grams of sodium persulfate in 40 grams of deionized water were added to the kettle. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 3.0, 30.3% solids content and an average particle size of 145 nm.

EXAMPLE 2

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 2.7 grams of Abex® CO-436 surfactant (Abex is a trademark of Rhone Poulenc), 10.0 grams of methacrylic acid, and 780.0 grams of methyl methacrylate.. From this ME, 164 grams were removed and set aside. To the remaining ME was added 14.5 grams of Abex® CO-436, and 510 grams of methacrylic acid. With the kettle water at 86° C., a mixture of 160 grams of deionized water and 1.40 grams of Abex® CO-436, followed by the ME removed from the initial ME, followed by a mixture of 5.5 grams of sodium persulfate in 40 grams of deionized water were added to the kettle. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 2.8, 31.4% solids content and an average particle size of 146 nm.

EXAMPLE 3

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 2.7 grams of Abex® CO-436 surfactant, 10.0 grams of methacrylic acid, and 780.0 grams of methyl methacrylate. From this ME, 164 grams were removed and set aside. To the remaining ME was added 27.0 grams of Abex® CO-436, and 510 grams of methacrylic acid. With the kettle water at 86° C., a mixture of 160 grams of deionized water, 4.0 grams of Abex® CO-436, and 20.0 grams of Plurafac® B-25-5 followed by the ME removed from the initial ME, followed by a mixture of 5.5 grams of sodium persulfate in 40 grams of deionized water were added to the kettle. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 2.7, 31.9% solids content and an average particle size of 153 nm.

EXAMPLE 4

A core was prepared as follows: A 5-liter, four necked round bottom flask was equipped with paddle stirrer, thermometer, nitrogen inlet, and reflux condenser. Deionized water, 1700 grams, was added to the kettle and heated to 80° C. under a nitrogen atmosphere. A monomer emulsion (ME) was prepared by mixing 335 grams of deionized water, 14.0 grams of sodium dodecylbenzenesulfonate (SDS, 23%), 4.5 grams of methacrylic acid, and 364.5 grams of methyl methacrylate. From this ME, 82 grams were removed and set aside. To the remaining ME was added 7.0 grams of SDS (23%) and 241.0 grams of methacrylc acid. With the kettle water at 80° C., the ME removed from the initial ME was added to the kettle, followed by the addition of a mixture of 2.75 grams of sodium persulfate in 15 grams of deionized water. The contents of the kettle were stirred for 15 minutes. The remaining ME was then fed to the kettle over a two hour period at 80° C. After the completion of the monomer feed the dispersion was held at 80° C. for 15 minutes, cooled to 250C and filtered to remove any coagulum. The filtered dispersion had a pH of 3.1, 22.1% solids content and an average particle size of 184 nm.

EXAMPLE 5

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 2.7 grams of Abex® CO-436 surfactant, 10.0 grams of methacrylic acid, and 780.0 grams of methyl methacrylate. From this ME, 164 grams were removed and set aside. To the remaining ME was added 9.0 grams of Abex® CO-436, and 510 grams of methacrylic acid. With the kettle water at 86° C., a mixture of 160 grams of deionized water and 0.90 grams of Abex® CO-436, followed by the ME removed from the initial ME, followed by a mixture of 5.5 grams of sodium persulfate in 40 grams of deionized water was added to the kettle. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 2.8, 31.6% solids content and an average particle size of 171 nm.

EXAMPLE 6

A core was prepared as follows: A 5-liter, four necked round bottom flask was equipped with paddle stirrer, thermometer, nitrogen inlet, and reflux condenser. Deionized water, 1700 grams, was added to the kettle and heated to 80° C. under a nitrogen atmosphere. A monomer emulsion (ME) was prepared by mixing 335 grams of deionized water, 10.7 grams of Disponil® Fes-993 surfactant (Disponil is a trademark of Henkel), 4.5 grams of methacrylic acid, and 364.5 grams of methyl methacrylate. From this ME, 82 grams were removed and set aside. To the remaining ME was added 5.40 grams of Disponil® Fes-993 and 241.0 grams of methacrylic acid. With the kettle water at 80° C., a mixture of 50 grams of deionized water and 10.0 grams of Plurafac®B- 25-5, followed by the ME removed from the initial ME, followed by a mixture of 2.75 grams of sodium persulfate in 15 grams of deionized water were added to the kettle. The reaction mixture was stirred for 15 minutes. The remaining ME was then fed to the kettle over a two hour period at 80° C. After the completion of the monomer feed the dispersion was held at 80° C. for 15 minutes, cooled to 25° C. and filtered to remove any coagulum. The filtered dispersion had a pH of 3.1, 21.5% solids content and an average particle size of 161 nm.

EXAMPLE 7

A core was prepared as follows: A 5-liter, four necked round bottom flask was equipped with paddle stirrer, thermometer, nitrogen inlet, and reflux condenser. Deionized water, 1700 grams, was added to the kettle and heated to 80° C. under a nitrogen atmosphere. A monomer emulsion (ME) was prepared by mixing 335 grams of deionized water, 14.0 grams of sodium dodecylbenzenesulfonate (SDS, 23%), 4.5 grams of methacrylic acid, and 364.5 grams of methyl methacrylate. From this ME, 82 grams were removed and set aside. To the remaining ME was added 7.0 grams of SDS(23%) and 241.0 grams of methacrylic acid. With the kettle water at 80° C., a mixture of 50 grams of deionized water and 9.8 grams of Plurafac® B- 25-5, followed by the ME removed from the initial ME, followed by a mixture of 2.75 grams of sodium persulfate in 15 grams of deionized water were added to the kettle. The contents of the kettle were stirred for 15 minutes. The remaining ME was then fed to the kettle over a two hour period at 80° C. After the completion of the monomer feed the dispersion was held at 80° C. for 15 minutes, cooled to 25° C. and filtered to remove any coagulum. The filtered dispersion had a pH of 3.0, 21.9% solids content and an average particle size of 220 nm.

EXAMPLE 8

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 6.85 grams of sodium dodecylbenzenesulfonate (SDS, 23%), 10.0 grams of methacrylic acid, and 780.0 grams of methyl methacrylate. From this ME, 164 grams were removed and set aside. To the remaining ME was added 15.0 grams of SDS (23%) and 510 grams of methacrylic acid. With the kettle water at 86° C., a mixture of 160 grams of deionized water, 1.75 grams of SDS (23%), and 10.0 grams of Plurafac® B-25-5, followed by the ME removed from the initial ME, followed by a mixture of 5.5 grams of sodium persulfate in 40 grams of deionized water were added to the kettle. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 2.9, 31.9% solids content and an average particle size of 349 nm.

EXAMPLE 9

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 5.25 grams of Disponil® Fes-993, 10.0 grams of methacrylic acid, and 780.0 grams of methyl methacrylate. From this ME, 164 grams were removed and set aside. To the remaining ME was added 11.5 grams of Disponil® Fes-993 and 510 grams of methacrylic acid. With the kettle water at 86° C., a mixture of 160 grams of deionized water, 0.4 grams of Disponil® Fes-993, and 20.5 grams of Silwet° L-7001 (Silwet is a trademark of Witco), followed by the ME removed from the initial ME, followed by a mixture of 5.5 grams of sodium persulfate in 40 grams of deionized water were added to the kettle. The contents of the kettle were stirred for 15 minutes. The remaining ME was then fed to the kettle over a two hour period at 85° C. After the completion of the monomer feed the dispersion was held at 85° C for 15 minutes, cooled to 25° C. and filtered to remove any coagulum. The filtered dispersion had a pH of 2.8, 31.6% solids content and an average particle size of 401 nm.

EXAMPLE 10

A core was prepared as follows: A 5-liter, four necked round bottom flask was equipped with paddle stirrer, thermometer, nitrogen inlet, and reflux condenser. Deionized water, 1700 grams, was added to the kettle and heated to 80° C. under a nitrogen atmosphere. A monomer emulsion (ME) was prepared by mixing 335 grams of deionized water, 1.0 gram of Abex° CO-436, 4.5 grams of methacrylic acid, and 364.5 grams of methyl methacrylate. From this ME, 82 grams were removed and set aside. To the remaining ME was added 2.80 grams of Abex® CO-436 and 241.0 grams of methacrylic acid. With the kettle water at 80° C., the ME removed from the initial ME, followed by a mixture of 2.75 grams of ammonium persulfate in 15 grams of deionized water were added to the kettle. The contents of the kettle were stirred for 15 minutes. The remaining ME was then fed to the kettle over a two hour period at 80° C. After the completion of the monomer feed the dispersion was held at 80° C. for 15 minutes, cooled to 25° C. and filtered to remove any coagulum. The filtered dispersion had a pH of 3.0, 22.2% solids content and an average particle size of 328 nm.

EXAMPLE 11

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 6.8 grams of sodium dodecylbenzenesulfonate (SDS, 23%), 10.0 grams of methacrylic acid, and 780.0 grams of methyl methacrylate. From this ME, 164 grams were removed and set aside. To the remaining ME was added 51.5 grams of SDS and 510 grams of methacrylic acid. With the kettle water at 86° C., a mixture of 160 grams of deionized water, 25.0 grams of SDS, and 20.5 grams of Plurafac® B-25-5, followed by the ME removed from the initial ME, followed by a mixture of 5.5 grams of sodium persulfate in 40 grams of deionized water were added to the kettle. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 3.0, 31.6% solids content and an average particle size of 94 nm.

EXAMPLE 12

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 6.8 grams of sodium dodecylbenzenesulfonate (SDS, 23%), 10.0 grams of methacrylic acid, and 780.0 grams of methyl methacrylate. From this ME, 164 grams were removed and set aside. To the remaining ME was added 51.5 grams of SDS and 510 grams of methacrylic acid. With the kettle water at 86° C., a mixture of 160 grams of deionized water, 25.0 grams of SDS(23%), and 20.5 grams of Silwet° L-7210, followed by the ME removed from the initial ME, followed by a mixture of 5.5 grams of sodium persulfate in 40 grams of deionized water were added to the kettle. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 2.9, 31.5% solids content and an average particle size of 81nm.

EXAMPLE 13

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 6.65 grams of sodium dodecylbenzenesulfonate (SDS, 23%), 10.0 grams of methacrylic acid, and 780.0 grams of methyl methacrylate. From this ME, 164 grams were removed and set aside. To the remaining ME was added 62.6 grams of SDS(23%) and 510 grams of methacrylic acid. With the kettle water at 86° C., a mixture of 160 grams of deionized water and 20.2 grams of SDS(23%), followed by the ME removed from the initial ME, followed by a mixture of 5.5 grams of sodium persulfate in 40 grams of deionized water were added to the kettle. The reaction mixture was stirred for 15 minutes. The remaining ME was then fed to the kettle over a two hour period at 85° C. After the completion of the monomer feed the dispersion was held at 85° C. for 15 minutes, cooled to 250C and filtered to remove any coagulum. The filtered dispersion had a pH of 3.0, 30.6% solids content and an average particle size of 91 nm.

EXAMPLE 14

A core was prepared as follows: A 5-liter, four necked round bottom flask was equipped with paddle stirrer, thermometer, nitrogen inlet, and reflux condenser. Deionized water, 2260 grams, was added to the kettle and heated to 86° C. under a nitrogen atmosphere. A monomer emulsion (ME) was prepared by mixing 720 grams of deionized water, 2.70 grams of Abex® CO-436, 10.0 grams of methacrylic acid, and 780.0 grams of methyl methacrylate. From this ME, 164 grams were removed and set aside. To the remaining ME was added 23.0 grams of Abex® CO-436 and 510 grams of methacrylic acid. With the kettle water at 86° C., a mixture of 160 grams of deionized water and 8.0 grams of Abex® CO-436, followed by he ME removed from the initial ME, followed by a mixture of 2.75 grams of ammonium persulfate in 40 grams of deionized water were added to the kettle. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 2.8, 28.7% solids content and an average particle size of 80 nm.

EXAMPLE 15

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 17.2 grams of Abex® CO-436, 520.0 grams of methacrylic acid, and 780.0 grams of methyl methacrylate. With the kettle water at 86° C., a mixture of 160 grams of deionized water and 3.0 grams of Abex® CO-436, followed by a mixture of 5.5 grams of sodium persulfate in 40 grams of deionized water were added to the kettle. The ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 2.8, 30.7% solids content and a average particle size of 87 nm.

EXAMPLE 16

A core was prepared as follows: A 5-liter, four necked round bottom flask was equipped with paddle stirrer, thermometer, nitrogen inlet, and reflux condenser. Deionized water, 1760 grams, was added to the kettle and heated to 86° C. under a nitrogen atmosphere. A monomer emulsion (ME) was prepared by mixing 720 grams of deionized water, 2.7 grams of Abex® CO-436, 10.0 grams of methacrylic acid, and 780.0 grams of methyl methacrylate. From this ME, 164 grams were removed and set aside. To the remaining ME was added 14.5 grams of Abex® CO-436, and 510 grams of methacrylic acid. With the kettle water at 86° C., a mixture of 160 grams of deionized water and 3.0 grams of Abex® CO-436, followed by the ME removed from the initial ME, followed by a mixture of 5.5 grams of sodium persulfate in 40 grams of deionized water were added to the kettle. The contents of the kettle were stirred for 15 minutes. The remaining ME was then fed to the kettle over a two hour period at 85° C. After the completion of the monomer feed the dispersion was held at 85° C. for 15 minutes, cooled to 25° C. and filtered to remove any coagulum. The filtered dispersion had a pH of 2.8, 31.3% solids content and an average particle size of 118 nm.

The dry bulk density, as used herein, and in the appended claims, was determined according to the following procedure. To a 50 milliliter ("ml") centrifuge tube was added 6.3 grams of polymer solids. Deionized water was added to the centrifuge tube to provide a total of 35 grams ("g") of material in the centrifuge tube which corresponds to 18 percent by weight of polymer solids. The tube was placed in a centrifuge spun at 18,000 revolutions per minute for 120 minutes. The supernatant was decanted and weighed. The dry density was then determined by the following equations:

$$\text{Dry Density} = \% \, Poly \times d$$

$$\% \, Poly = 1 - \% \, H2O$$

$$\% \, H2O = \frac{V \, H2O}{V \, H2O + VP} = \frac{(VT - S \, H2O) \times FR - VP}{(VT - S \, H2O) \times FR}$$

$$VH2O = (VT - SH2O) \times FR - VP$$

$$V_P + V_{H2O} = (V_T - S_{H2O}) \times F_R$$

$$F_R = \frac{V_P + V_{H2O}}{V_P + V_{H2O} + I_{H2O}} = \frac{V_P + V_{H2O}}{\text{Hard Pack}}$$

$$\text{Hard Pack} = V_T - S_{H2O} = \frac{V_P + V_{H2O}}{F_R}$$

where:
$W_T$=total weight in tube=35.0 grams
$V_{H2O}$=Volume of water inside the particles
$I_{H2O}$=Interstitial water volume
d=polymer density=measured 1.084 g/cc
$V_p$=Polymer volume (6.3 g/1.084 g/cc=5.81 cc)
$V_T$=total volume in tube=35 g–6.3 g solids=28.7g or cc water+5.81 cc polymer=34.51 cc
$S_{H2O}$=volume of supernate=weight of supernate
$\%_{H2O}$=Percent water inside particles
% POLY=Percent polymer in particles
$F_R$=Packing constant, which is a correction corresponding to the fraction of volume solids in the hard pack. The following packing constant values were used based on the particle size of the polymer sample:

| Particle Size Range (nm) | $F_R$ |
|---|---|
| <275 | 0.611 |
| 275–500 | 0.624 |
| 501–750 | 0.638 |
| 751–1300 | 0.645 |

The values of the packing constants used were based on density determinations (as described above) for unswollen polymer particles such that $V_{H2O}$ is zero. The packing constant, $F_R$ is defined as:

$$F_R = \frac{V_P + V_{H2O}}{V_P + V_{H2O} + I_{H2O}} = \frac{V_P + V_{H2O}}{\text{Hard Pack}} = \frac{V_P}{\text{Hard Pack}}.$$

$V_P$=Polymer volume (6.3 g/1.084 g/cc=5.81 cc)

$I_{H2O}$=Interstitial water volume=$(W_T-S_{H2O}-6.3 \text{ g})/1.0$ g/cc
$W_T$=total weight in tube=35.0 grams
$S_{HS)}$=weight of supernate Using the above expression the packing constants were determined for several polymer samples having average particle sizes in the range of from about 200 nm to 1275 nm..

| Sample # | P.S. (nm) | $S_{H2O}$ | $V_P$ | $I_{H2O}$ | $V_P + I_{H2O}$ | $F_R$ |
|---|---|---|---|---|---|---|
| 1 | 213 | 25.0 | 5.81 | 3.70 | 9.51 | 0.611 |
| 2 | 440 | 25.2 | 5.81 | 3.50 | 9.31 | 0.624 |
| 3 | 650 | 25.4 | 5.81 | 3.30 | 9.11 | 0.638 |
| 4 | 1275 | 25.5 | 5.81 | 3.20 | 9.01 | 0.645 |

All particle sizes reported herein were measured using a Brookhaven BI-90 Particle Sizer and are reported as an average particle size.

EXAMPLE 17

A 5-liter, four necked round bottom flask was equipped with paddle stirrer thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 190.5 grams of the core prepared in Example 1. A monomer emulsion (ME I) which was prepared by mixing 50 grams of deionized water, 3.0 grams of SDS(23%), 10.8 grams of butyl methyacrylate, 106.8 grams of methyl methacrylate, and 2.4 grams of methacrylic acid was added to the kettle at a rate of 4.5 grams/minute at a temperature of 80°. Upon completion of ME I, a second monomer emulsion (ME II) was prepared by mixing 190 grams of deionized water, 3.8 grams of SDS (23%), and 720 grams of styrene. From this ME II, 137 grams were removed and set aside. The initial portion of ME II was added to the kettle at a rate of 25 grams/minute and a mixture of 1.9 grams of sodium persulfate dissolved in 75 grams of deionized water was co-fed to the reactor at a rate of 2.5 grams/minute. The temperature of the reaction mixture was allowed to increase to 92° C. Upon completion of the ME II and co-feeds a mixture of 8 grams of 4-hydroxy TEMPO and 8 grams of deionized water was added to the kettle and the batch was cooled to 85° C. When the reaction mixture reached 85° C., the held back portion of ME II (137 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 27.5%, a pH of 10.0, and a particle size of 404 nm. An acid titration showed good core encapsulation with only 4.0% core acid titratable. The dry density of this polymer was determined to be 0.6189 g/cc.

EXAMPLE 18

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 191.0 grams of the core prepared in Example 2. A monomer emulsion (ME I) which was prepared by mixing 50 grams of deionized water, 3.0 grams of SDS (23%),10.8 grams of butyl methacrylate, 106.8 grams of methyl methacrylate, and 2.4 grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS, and 720 grams of styrene. From ME II, 91.4 grams were removed and set aside. The initial portion of ME II was added to the kettle at a rate of 25 grams/minute and a mixture of 1.9 grams of sodium persulfate dissolved in 75 grams of deionized water was co-fed to the reactor at a rate of 2.5 grams/minute. The temperature of the reaction mixture was allowed to increase to 92° C. Upon completion of the ME II and co-feeds a mixture of 8 grams of 4-hydroxy TEMPO and 8 grams of deionized water was added to the kettle and the batch was cooled to 85° C. When the reaction mixture reached 85° C., the held back portion of ME II (91.4 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 27.4%, a pH of 9.9, and a particle size of 440 nm. An acid titration showed good core encapsulation with only 2.0% core acid titratable. The dry density was calculated to be 0.6077 g/cc.

EXAMPLE 19

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 188.0 grams of the core prepared in Example 3. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS, and 720 grams of styrene. From ME II, 91.4 grams were removed and set aside. The initial portion of M II was added to the kettle at a rate of 25 grams/minute and a mixture of 1.9 grams of sodium persulfate dissolved in 75 grams of deionized water was co-fed to the reactor at a rate of 2.5 grams/ minute. The temperature of the reaction mixture was allowed to increase to 92° C. Upon completion of the ME II and co-feeds a mixture of 8 grams of 4-hydroxy TEMPO and 8 grams of deionized water was added to the kettle and the batch is cooled to 85° C. When the contents of the reactor reached 85° C., the held back portion of ME II (91.4 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed.

The final latex had a solids content of 27.3%, a pH of 10.2, and a particle size of 370 nm. An acid titration showed good core encapsulation with only 2.5% core acid titratable. The dry density was calculated to be 0.6466 g/cc.

EXAMPLE 20

A 5-liter, four necked round bottom flask was equipped with paddle stirrer, thermometer, nitrogen inlet, and reflux condenser. Deionized water, 1400 grams, was added to the kettle and heated to 86° C. under a nitrogen atmosphere. To the heated kettle water was added 3.8 grams of sodium persulfate dissolved in 30 grams of deionized water. This was immediately followed by 271.5 grams of the core prepared in Example 4. A monomer emulsion (ME I) was prepared by mixing 50 grams of deionized water, 3.0 grams of SDS (23%),10.8 grams of butyl methacrylate, 106.8 grams of methyl methacrylate, and 2.4 grams of methacrylic acid and was added to the kettle at a rate of 4.5 grams/minute at a temperature of 800.

Upon completion of ME I a second monomer emulsion (ME II) was prepared by mixing 190 grams of deionized water, 3.8 grams of SDS (23%), and 720 grams of styrene. From ME I, 137 grams were removed and set aside. The initial portion of ME II was added to the kettle at a rate of 25 grams/minute and a mixture of 1.9 grams of sodium persulfate dissolved in 75 grams of deionized water was co-fed to the reactor at a rate of 2.5 grams/minute. The temperature of the kettle is allowed to increase to 92° C. Upon completion of the ME II and co-feeds a mixture of 8 grams of 4-hydroxy TEMPO and 8 grams of deionized water was added to the kettle and the batch was cooled to 85° C. When the kettle temperature reached 85° C., the held back portion of ME II (137 grams) was added to the reactor followed by the addition of 42 grams of ammonium hydroxide. The contents of the reactor were held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 29.5%, a pH of 10.2, and a particle size of 525 nm. An acid titration showed good core encapsulation with only 5.0% core acid titratable. The dry density of this polymer was determined to be 0.5735 g/cc.

EXAMPLE 21

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 189.9 grams of the core prepared in Example 5. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS, and 720 grams of styrene. From ME II, 137 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the feed rate of ME II was increased to 25 grams/minute. The temperature of the kettle was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the kettle temperature reached 85° C., the held back portion of ME II (137 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 27.3%, a pH of 10.2, and a particle size of 577 nm. An acid titration showed good core encapsulation with only 5.0% core acid titratable. The dry density of this polymer was determined to be 0.5605 g/cc.

EXAMPLE 22

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 279.9 grams of the core prepared in Example 6. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS, and 720 grams of styrene. From ME II, 91.4 grams were removed and set aside. The initial portion of ME II was added to the kettle at a rate of 25.0 grams/minute and a mixture of 1.9 grams of sodium persulfate dissolved in 75 grams of deionized water was co-fed to the reactor at a rate of 2.5 grams/minute. The temperature of the reaction mixture was allowed to increase to 92° C. Upon completion of the ME II and co-feeds a mixture of 8 grams of 4-hydroxy TEMPO and 8 grams of deionized water was added to the kettle and the batch was cooled to 85° C. When the kettle temperature reached 85° C., the held back portion of ME 11 (91.4 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 26.6%, a pH of 10.1, and a particle size of 515 rm. An acid titration showed good core encapsulation with only 2.5% core acid titratable. The dry density of this polymer was determined to be 0.5979 g/cc.

EXAMPLE 23

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 274.0 grams of the core prepared in Example 7. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS, and 720 grams of styrene. From ME II, 91.4 grams were removed and set aside. The initial portion of ME II was added to the kettle at a rate of 25.0 grams/minute and a mixture of 1.9 grams of sodium persulfate dissolved in 75 grams of deionized water was co-fed to the reactor at a rate of 2.5 grams/minute. The temperature of the batch was allowed to increase to 92° C. Upon completion of the ME II and co-feeds a mixture of 8 grams of 4-hydroxy TEMPO and 8 grams of deionized water was added to the kettle and the batch was cooled to 85° C. When the kettle temperature reached 85° C., the held back portion of ME II (91.4 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 26.6%, a pH of 10.3, and a particle size of 650 nm. An acid titration showed good core encapsulation with only 5.4% core acid titratable. The dry density of this polymer was determined to be 0.5804 g/cc.

EXAMPLE 24

A 5-liter, four necked round bottom flask was equipped with paddle stirrer, thermometer, nitrogen inlet, and reflux condenser. Deionized water, 2000 grams, was added to the kettle and heated to 86° C. under a nitrogen atmosphere. To the heated kettle water was added 3.8 grams of sodium persulfate dissolved in 30 grams of deionized water. This was immediately followed by 188.0 grams of the core prepared in Example 8. A monomer emulsion (ME I) was prepared by mixing 50 grams of deionized water, 3.0 grams of SDS, 12.0 grams of butyl methacrylate, 105.6 grams of methyl methacrylate, and 2.4 grams of methacrylic acid and was added to the kettle at a rate of 3.0 grams/minute at a temperature of 80° C. Upon completion of ME I a second monomer emulsion (ME II) was prepared by mixing 160 grams of deionized water, 3.2 grams of SDS, 600 grams of styrene, and 1.5 grams of allyl methacrylate. From ME II, 114 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of kettle was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the temperature of the kettle reached 85° C., the held back portion of ME II (114 grams) was added to the reactor followed by the addition of 38 grams of ammonium hydroxide. The reaction mixture was held 5 minutes at 85° C. After the 5 minute hold a mixture of 0.95 grams of sodium persulfate dissolved in 20 grams of deionized water was added to the kettle. The kettle was held for 30 minutes at 85° C. and then cooled to room temperature and filtered to remove any coagulum formed. The final latex had a solids content of 22.6%, a pH of 10.4, and a particle size of 1235 nm. An acid titration showed good core encapsulation with only 2.0% core acid titratable. The dry density of this polymer was determined to be 0.4670 g/cc.

EXAMPLE 25

A 5-liter, four necked round bottom flask was equipped with paddle stirrer, thermometer, nitrogen inlet, and reflux condenser. Deionized water, 2000 grams, was added to the kettle and heated to 86° C. under a nitrogen atmosphere. To the heated kettle water was added 3.8 grams of sodium persulfate dissolved in 30 grams of deionized water. This was immediately followed by 188.9 grams of the core prepared in Example 9. A monomer emulsion (ME I) was prepared by mixing 50 grams of deionized water, 3.0 grams of SDS, 12.0 grams of butyl methacrylate, 105.6 grams of methyl methacrylate, and 2.4 grams of methacrylic acid and was added to the kettle at a rate of 3.0 grams/minute at a temperature of 80° C. Upon completion of ME I a second monomer emulsion (M II) was prepared by mixing 160 grams of deionized water, 3.2 grams of SDS, 600 grams of styrene, 3.0 grams of linseed oil fatty acid and 1.5 grams of allyl methacrylate. From ME II, 114 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of the reaction mixture was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the kettle temperature reached 85° C., the held back portion of ME II (114 grams) was added to the reactor followed by the addition of 38 grams of ammonium hydroxide. The contents of the kettle were held 5 minutes at 85° C. After the 5 minute hold a mixture of 0.95 grams of sodium persulfate dissolved in 20 grams of deionized water was added to the kettle. The batch was held for 30 minutes at 85° C. and then cooled to room temperature and filtered to remove any coagulum formed. The final latex had a solids content of 22.4%, a pH of 10.3, and a particle size of 1275 nm. An acid titration showed good core encapsulation with only 4.5% core acid titratable. The dry density of this polymer was determined to be 0.4357 g/cc.

EXAMPLE 26

A 5-liter, four necked round bottom flask was equipped with paddle stirrer, thermometer, nitrogen inlet, and reflux condenser. Deionized water, 2000 grams, was added to the kettle and heated to 86° C. under a nitrogen atmosphere. To the heated kettle water was added 3.8 grams of sodium persulfate dissolved in 30 grams of deionized water. This was immediately followed by 270.3 grams of the core prepared in Example 10. A monomer emulsion (ME I) was prepared by mixing 50 grams of deionized water, 3.0 grams of SDS, 12.0 grams of butyl methacrylate, 105.6 grams of methyl methacrylate, and 2.4 grams of methacrylic acid and was added to the kettle at a rate of 3.0 grams/minute at a temperature of 80° C. Upon completion of ME I a second monomer emulsion (ME II) was prepared by mixing 160 grams of deionized water, 3.2 grams of SDS, 600 grams of styrene, and 3.0 grams of divinyl benzene. From ME II, 114 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of the reaction mixture was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the kettle temperature reached 85° C., the held back portion of ME II (114 grams) was added to the reactor followed by the addition of 38 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 22.1%, a pH of 10.0, and a particle size of 907 nm. An acid titration showed good core encapsulation with only 2.0% core acid titratable. The dry density of this polymer was determined to be 0.4648 g/cc.

EXAMPLE 27

A 5-liter, four necked round bottom flask was equipped with paddle stirrer, thermometer, nitrogen inlet, and reflux condenser. Deionized water, 2200 grams, was added to the kettle and heated to 86° C. under a nitrogen atmosphere. To the heated kettle water was added 3.8 grams of sodium persulfate dissolved in 30 grams of deionized water. This was immediately followed by 189.9 grams of the core prepared in Example 11. A monomer emulsion (ME I) was prepared by mixing 100 grams of deionized water, 6.0 grams of SDS, 21.6 grams of butyl methacrylate, 213.6 grams of methyl methacrylate, and 4.8 grams of methacrylic acid and was added to the kettle at a rate of 6.0 grams/minute at a temperature of 80° C. Upon completion of ME II a second monomer emulsion (ME II) was prepared by mixing 190 grams of deionized water, 3.8 grams of SDS(23%), and 720 grams of styrene. From ME I, 137 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.0 grams/minute. After 10 minutes the rate of ME II was increased to 25 grams/minute. The temperature of the reaction mixture was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the reaction mixture reached 85° C., the held back portion of ME II (137 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 25.0%, a pH of 10.2, and a particle size of 276 nm. An acid titration showed good core encapsulation with only 4.5% core acid titratable. The dry density of this polymer was determined to be 0.6985 g/cc.

EXAMPLE 28

A 5-liter, four necked round bottom flask was equipped with paddle stirrer, thermometer, nitrogen inlet, and reflux condenser. Deionized water, 2200 grams, was added to the kettle and heated to 86° C. under a nitrogen atmosphere. To the heated kettle water was added 3.8 grams of sodium persulfate dissolved in 30 grams of deionized water. This was immediately followed by 190.5 grams of the core prepared in Example 12. A monomer emulsion (ME I) was prepared by mixing 100 grams of deionized water, 6.0 grams of SDS, 21.6 grams of butyl methacrylate, 213.6 grams of methyl methacrylate, and 4.8 grams of methacrylic acid and was added to the kettle at a rate of 6.0 grams/minute at a temperature of 80° C. Upon completion of ME I a second monomer emulsion (ME II) was prepared by mixing 190 grams of deionized water, 3.8 grams of SDS, and 720 grams of styrene. From ME II, 91.4 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.0 grams/minute. After 10 minutes the rate of ME II was increased to 25 grams/minute. The temperature of the reaction mixture was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the reaction mixture reached 85° C., the held back portion of ME II (91.4 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 26.0%, a pH of 10.2, and a particle size of 213 nm. An acid titration showed good core encapsulation with only 4.0% core acid titratable. The dry density of this polymer was determined to be 0.7631 g/cc.

EXAMPLE 29

A 5-liter, four necked round bottom flask was equipped with paddle stirrer, thermometer, nitrogen inlet, and reflux condenser. Deionized water, 2200 grams, was added to the kettle and heated to 86° C. under a nitrogen atmosphere. To the heated kettle water was added 3.8 grams of sodium persulfate dissolved in 30 grams of deionized water. This was immediately followed by 196.1 grams of the core prepared in Example 13. A monomer emulsion (ME I) was prepared by mixing 100 grams of deionized water, 6.0 grams of SDS, 21.6 grams of butyl methacrylate, 213.6 grams of methyl methacrylate, and 4.8 grams of methacrylic acid and was added to the kettle at a rate of 6.0 grams/minute at a temperature of 80° C. Upon completion of ME I a second monomer emulsion (ME II) was prepared by mixing 190 grams of deionized water, 3.8 grams of SDS, 720 grams of styrene, and 3.6 grams of linseed oil fatty acid. From ME II, 137 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.0 grams/minute. After 10 minutes the rate of ME II was increased to 25 grams/minute. The temperature of the reaction mixture was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the reaction mixture reached 85° C., the held back portion of ME II (91.4 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 24.9%, a pH of 10.2, and a particle size of 284 nm. An acid titration showed good core encapsulation with only 5.0% core acid titratable. The dry density of this polymer was determined to be 0.6500 g/cc.

EXAMPLE 30

A 5-liter, four necked round bottom flask was equipped with paddle stirrer, thermometer, nitrogen inlet, and reflux condenser. Deionized water, 1620 grams, was added to the kettle and heated to 86° C. under a nitrogen atmosphere. To the heated kettle water was added 2.66 grams of sodium persulfate dissolved in 21.0 grams of deionized water. This was immediately followed by 146.3 grams of the core prepared in Example 14. A monomer emulsion (ME I) was prepared by mixing 70 grams of deionized water, 4.2 grams of SDS, 15.1 grams of butyl methacrylate, 149.5 grams of methyl methacrylate, and 3.36 grams of methacrylic acid and was added to the kettle at a rate of 4.0 grams/minute at a temperature of 80° C. Upon completion of ME I a second monomer emulsion (ME II) was prepared by mixing 133 grams of deionized water, 2.7 grams of SDS, and 504 grams of styrene. From ME II, 64 grams were removed and set aside. The initial portion of ME II was added to the kettle at a rate of 8.8 grams/minute and a mixture of 1.3 grams of sodium persulfate dissolved in 60 grams of deionized water was co-fed to the reactor at a rate of 1.50 grams/minute. After 10 minutes the rate of ME 11 was increased to 17.5 grams/minute. The temperature of the reaction mixture was allowed to increase to 92° C. Upon completion of the ME II and co-feeds a mixture of 5.6 grams of 4-hydroxy TEMPO and 5.6 grams of deionized water was added to the reaction mixture and the batch was cooled to 85° C. When the reaction mixture reaches 85° C., the held back portion of ME II (64.0 grams) was added to the reactor followed by the addition of 26.6 grams of ammonium hydroxide. The reaction mixture was held 5 minutes at 85° C. After the 5 minute hold a mixture of 0.67 grams of sodium persulfate dissolved in 14 grams of deionized water was added to the kettle. The reaction mixture was held for 30 minutes at 85° C. and then cooled to room temperature and filtered to remove any coagulum formed. The final latex had a solids content of 24.5%, a pH of 10.2, and a particle size of 196 nm. An acid titration showed good core encapsulation with only 2.0% core acid titratable. The dry density of this polymer was determined to be 0.7955 g/cc.

EXAMPLE 31

A 5-liter, four necked round bottom flask was equipped with paddle stirrer, thermometer, nitrogen inlet, and reflux condenser. Deionized water, 2000 grams, was added to the kettle and heated to 86° C. under a nitrogen atmosphere. To the heated kettle water was added 3.8 grams of sodium persulfate dissolved in 30 grams of deionized water. This was immediately followed by 195.4 grams of the core prepared in Example 15. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 3.0 grams/minute at a temperature of 80° C. Upon completion of ME I a second monomer emulsion (ME II) was prepared by mixing 190 grams of deionized water, 3.8 grams of SDS, and 720 grams of styrene. From ME II, 137 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of the reaction mixture was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the reaction mixture reaches 85° C., the held back portion of ME II (137.0 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 25.2%, a pH of 10.0, and a particle size of 305 nm. An acid titration showed good core encapsulation with only 4.0% core acid titratable. The dry density of this polymer was determined to be 0.6690 g/cc.

EXAMPLE 32

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 191.5 grams of the core prepared in Example 16. A monomer emulsion (ME I) was prepared by mixing 50 grams of deionized water, 3.0 grams of SDS (23%), 10.8 grams of butyl methacrylate, 106.8 grams of methyl methacrylate, and 2.4 grams of methacrylic acid and was added to the kettle at a rate of 3.0 grams/minute at a temperature of 80° C. Upon completion of ME I, a second monomer emulsion (ME II) was prepared by mixing 190 grams of deionized water, 3.8 grams of SDS (23%), 720 grams of styrene, and 3.6 grams of divinyl benzene. From ME II, 137 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of the batch was allowed to increase to 92° C. Upon completion of the ME II and co-feeds a mixture of 8 grams of 4-hydroxy TEMPO and 8 grams of deionized water was added to the kettle and the batch was cooled to 85° C. When the kettle temperature reached 85° C., the held back portion of ME 11 (137.0 grams) was added to the kettle followed by the addition of 42 grams of ammonium hydroxide. The kettle temperature was held at 85° C. for 5 minutes. After the 5 minute hold a mixture of 0.95 grams of sodium persulfate dissolved in 20 grams of deionized water was added to the kettle. The contents of the kettle were held for 30 minutes at 85° C. and then cooled to room temperature and filtered to remove any coagulum formed. The final latex had a solids content of 27.4%, a pH of 10.2, and a particle size of 334 nm. An acid titration showed good core encapsulation with only 2.5% core acid titratable. The dry density of this polymer was determined to be 0.6445 g/cc.

EXAMPLE 33

(Comparative) A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 199.8 grams of the core prepared in Example 1. A monomer emulsion (ME I) was prepared by mixing 50 grams of deionized water, 3.0 grams of SDS (23%), 10.8 grams of butyl methacrylate, 106.8 grams of methyl methacrylate, and 2.4 grams of methacrylic acid and was added to the kettle at a rate of 4.5 grams/minute at a temperature of 80° C. Upon completion of ME I, a second monomer emulsion (ME II) was prepared by mixing 190 grams of deionized water, 3.8 grams of SDS (23%), and 720 grams of styrene., From ME II, 137 grams were removed and set aside. The ME II was added to the kettle at a rate of 25.0 grams/minute and a mixture of 1.9 grams of sodium persulfate dissolved in 75 grams of deionized water was co-fed to the reactor at a rate of 2.5 grams/minute. The temperature of the batch was allowed to increase to 92° C. Upon completion of the ME II and co-feeds the batch was cooled to 85° C. (no inhibitor added). When the kettle temperature reached 85° C., the held back portion of ME II (137.0 grams) was added to the kettle followed by the addition of 42 grams of ammonium hydroxide. The kettle temperature was held at 85° C. for 5 minutes. After the 5 minute hold a mixture of 0.95 grams of sodium persulfate dissolved in 20 grams of deionized water was added to the kettle. The contents of the kettle were held for 30 minutes at 85° C. and then cooled to room temperature and filtered to remove any coagulum formed. The final latex had a solids content of 27.5%, a pH of 10.1, and a particle size of 320 nm. An acid titration showed good core encapsulation with only 4.0% core acid titratable. The dry density of this polymer was determined to be 0.7818 g/cc.

EXAMPLE 34

(Comparative) A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 1998.0 grams of the core prepared in Example 1. A monomer emulsion (ME I) was prepared by mixing 50 grams of deionized water, 3.0 grams of SDS (23%), 10.8 grams of butyl methacrylate, 106.8 grams of methyl methacrylate, and 2.4 grams of methacrylic acid and was added to the kettle at a rate of 4.5 grams/minute at a temperature of 80° C. Upon completion of ME I, a second monomer emulsion (ME II) was prepared by mixing 190 grams of deionized water, 3.8 grams of SDS (23%), and 720 grams of styrene. The ME II was added to the kettle at a rate of 25.0 grams/minute and a mixture of 1.9 grams of sodium persulfate dissolved in 75 grams of deionized water was co-fed to the reactor at a rate of 2.5 grams/minute. The temperature of the batch was allowed to increase to 92° C. When 777 grams of the ME II had been added to the kettle, 42 grams of ammonium hydroxide were added to the kettle and the ME II was continued. Upon completion of the ME II and co-feeds the batch was held for 5 minutes at 92° C. After the 5 minute hold the batch was cooled to 85° C. and a mixture of 0.95 grams of sodium persulfate dissolved in 20 grams of deionized water was added to the kettle. The contents of the kettle were held for 30 minutes at 85° C. and then cooled to room temperature and filtered to remove any coagulum formed. The final latex had a solids content of 27.7%, a pH of 10.1, and a particle size of 406 nm. An acid titration showed more core acid titratable (8.7%) compared to example #17. The dry density of this polymer was determined to be 0.6906 g/cc.

EXAMPLE 35

(Comparative) A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 1998.0 grams of the core prepared in Example 1. A monomer emulsion (ME I) was prepared by mixing 50 grams of deionized water, 3.0 grams of SDS (23%), 10.8 grams of butyl methacrylate, 106.8 grams of methyl methacrylate, and 2.4 grams of methacrylic acid and was added to the kettle at a rate of 4.5 grams/minute at a temperature of 80° C. Upon completion of ME I, a second monomer emulsion (ME II) was prepared by mixing 190 grams of deionized water, 3.8 grams of SDS (23%), and 720 grams of styrene. The ME II was added to the kettle at a rate of 25.0 grams/minute and a mixture of 1.9 grams of sodium persulfate dissolved in 75 grams of deionized water was co-fed to the reactor at a rate of 2.5 grams/minute. The temperature of the batch was allowed to increase to 92° C. When 457 grams of the ME II had been added to the kettle, 42 grams of ammonium hydroxide were added to the kettle and the ME II was continued. Upon completion of the ME II and co-feeds the batch was held for 5 minutes at 92° C. After the 5 minute hold the batch was cooled to 85° C. and a mixture of 0.95 grams of sodium persulfate dissolved in 20 grams of deionized water was added to the kettle. The contents of the kettle were held for 30 minutes at 85° C. and then cooled to room temperature and filtered to remove any coagulum formed. The final latex had a solids content of 24.0%, a pH of 10.0, and a particle size of 573 nm which was an increase in particle size over Example 17 (404 nm); some aggregation of the particles was observed which may account for the increased particle size measured. The increased particle size is an indication of particle aggregation caused by an increase in the amount of core acid in the aqueous phase and indeed an acid titration showed high core acid titratable (14.4%) compared to example #17. The dry density of this polymer was determined to be 0.6367 g/cc.

EXAMPLE 36

(Comparative) A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 189.9 grams of the core prepared in Example 5. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS, and 720 grams of styrene. ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the feed rate of ME II was increased to 25 grams/minute. The temperature of the kettle was allowed to increase to 92° C. When 777 grams of ME II had been fed to the kettle, 42 grams of ammonium hydroxide were then added to the kettle. Upon completion of the ME II and co-feeds the batch was held for 5 minutes at 920. After the 5 minute hold the batch was cooled to 85° C. and a mixture of 0.95 grams of sodium persulfate dissolved in 20 grams of deionized water was added to the kettle. The contents of the kettle were held for 30 minutes at 85° C. and then cooled to room temperature and filtered to remove any coagulum formed. The final latex had a solids content of 27.8%, a pH of 10.2, and a particle size of 570 nm. An acid titration showed good core encapsulation with only 5.0% core acid titratable. The dry density of this polymer was determined to be 0.6364 g/cc.

EXAMPLE 37

(Comparative) A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 189.9 grams of the core prepared in Example 5. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 4.5 grams/minute at a temperature of 800. Upon completion of ME I a second monomer emulsion (ME II) was prepared by mixing 190 grams of deionized water, 3.8 grams of SDS, and 720 grams of styrene. ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the feed rate of ME II was increased to 25 grams/minute. The temperature of the kettle was allowed to increase to 92° C. When 457 grams of ME II had been fed to the kettle, 42 grams of ammonium hydroxide were then added to the kettle. Upon completion of the ME II and co-feeds the batch was held for 5 minutes at 920. After the 5 minute hold the batch was cooled to 85° C. and a mixture of 0.95 grams of sodium persulfate dissolved in 20 grams of deionized water was added to the kettle. The contents of the kettle were held for 30 minutes at 85° C. and then cooled to room temperature and filtered to remove any coagulum formed. The final latex had a solids content of 26.5%, a pH of 10.2, and a particle size of 725 nm which was an increase in particle size over Example 21 (577 nm). The increased particle size is an indication of particle aggregation caused by an increase in the amount of core acid in the aqueous phase and indeed an acid titration showed high core acid titratable (18.5%) compared to Example 21. The dry density of this polymer was determined to be 0.6284 g/cc.

EXAMPLE 38

(Comparative) A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 189.9 grams of the core prepared in Example 5. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS, and 720 grams of styrene. ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the feed rate of ME II was increased to 25 grams/minute. The temperature of the kettle was allowed to increase to 92° C. When the ME II and co-feeds were complete, 42 grams of ammonium hydroxide were then added to the kettle. The batch was held for 5 minutes at 92°. After the 5 minute hold the batch was cooled to 85° C. and a mixture of 0.95 grams of sodium persulfate dissolved in 20 grams of deionized water was added to the kettle. The contents of the kettle were held for 30 minutes at 85° C. and then cooled to room temperature and filtered to remove any coagulum formed. The final latex had a solids content of 27.3%, a pH of 10.3, and a particle size of 530 nm. An acid titration showed good core encapsulation with only 2.0% core acid titratable. The dry density of this polymer was determined to be 0.8220 g/cc.

EXAMPLE 39

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 189.9 grams of the core prepared in Example 5. A monomer emulsion (ME I) was prepared by mixing 50 grams of deionized water, 3.0 grams of SDS, 10.8 grams of butyl methacrylate, 106.8 grams of methyl methacrylate, and 2A grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS, and 720 grams of styrene. From ME II, 137 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the feed rate of ME II was increased to 25 grams/minute. The temperature of the kettle was allowed to increase to 92° C. Upon completion of the ME II and co-feeds a mixture of 1 gram of N, N,-diethylhydroxylamine and 16 grams of deionized water was added to the reaction mixture and the batch was cooled to 85° C. When the kettle temperature reached 85° C., the held back portion of ME II (137 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 26.0%, a pH of 10.2, and a particle size of 580 nm. An acid titration showed good core encapsulation with only 5.0% core acid titratable. The dry density of this polymer was determined to be 0.5574 g/cc.

EXAMPLE 40

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 189.9 grams of the core prepared in Example 5. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS, and 720 grams of styrene. From ME II, 137 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the feed rate of ME II was increased to 25 grams/minute. The temperature of the kettle was allowed to increase to 92° C. Upon completion of the ME II and co-feeds, 42 grams of a 1% solution of 4-nitrosophenol magnesium salt in water was added to the contents of the kettle and the batch was cooled to 85° C. When the kettle temperature reached 85° C., the held back portion of ME II (137 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 26.8%, a pH of 10.2, and a particle size of 585 nm. An acid titration showed good core encapsulation with only 5.4% core acid titratable. The dry density of this polymer was determined to be 0.5481 g/cc.

EXAMPLE 41

(Comparative) A 5-liter, four necked round bottom flask was equipped with paddle stirrer, thermometer, nitrogen inlet, and reflux condenser. Deionized water, 2000 grams, was added to the kettle and heated to 86° C. under a nitrogen atmosphere. To the heated kettle water was added 3.8 grams of sodium persulfate dissolved in 30 grams of deionized water. This was immediately followed by 188.0 grams of the core prepared in Example 8. A monomer emulsion (ME I) was prepared by mixing 50 grams of deionized water, 3.0 grams of SDS, 12.0 grams of butyl methacrylate, 105.6 grams of methyl methacrylate, and 2A grams of methacrylic acid and was added to the kettle at a rate of 3.0 grams/minute at a temperature of 80° C. Upon completion of ME I a second monomer emulsion (ME II) was prepared by mixing 160 grams of deionized water, 3.2 grams of SDS, 600 grams of styrene, and 1.5 grams of allyl methacrylate. ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of kettle was allowed to increase to 92° C. When 650 grams of ME II had been fed to the kettle, 38 grams of ammonium hydroxide were added to the kettle. Upon completion of the ME II and co-feeds the batch was held for 5 minutes at 92° C. After the 5 minute hold the batch was cooled to 85° C. and a mixture of 0.95 grams of sodium persulfate dissolved in 20 grams of deionized water was added to the kettle. The kettle was held for 30 minutes at 85° C. and then cooled to room temperature and filtered to remove any coagulum formed. The final latex had a solids content of 22.9%, a pH of 10.3, and a particle size of 976 nm. An acid titration showed good core encapsulation with only 4.4% core acid titratable. The dry density of this polymer was determined to be 0.5247 g/cc.

EXAMPLE 42

(Comparative) A 5-liter, four necked round bottom flask was equipped with paddle stirrer, thermometer, nitrogen inlet, and reflux condenser. Deionized water, 2000 grams, was added to the kettle and heated to 86° C. under a nitrogen atmosphere. To the heated kettle water was added 3.8 grams of sodium persulfate dissolved in 30 grams of deionized water. This was immediately followed by 188.0 grams of the core prepared in Example 8. A monomer emulsion (ME I) was prepared by mixing 50 grams of deionized water, 3.0 grams of SDS, 12.0 grams of butyl methacrylate, 105.6 grams of methyl methacrylate, and 2.4 grams of methacrylic acid and was added to the kettle at a rate of 3.0 grams/minute at a temperature of 80° C. Upon completion of ME I a second monomer emulsion (ME II) was prepared by mixing 160 grams of deionized water, 3.2 grams of SDS, 600 grams of styrene, and 1.5 grams of allyl methacrylate. ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of kettle was allowed to increase to 92° C. When the ME II and co-feeds had been completed, 38 grams of ammonium hydroxide were added to the kettle and the batch was held for 5 minutes. After the 5 minute hold the batch was cooled to 85° C. and a mixture of 0.95 grams of sodium persulfate dissolved in 20 grams of deionized water was added to the kettle. The kettle was held for 30 minutes at 85° C. and then cooled to room temperature and filtered to remove any coagulum formed. The final latex had a solids content of 22.9%, a pH of 10.2, and a particle size of 1023 nm. An acid titration showed good core encapsulation with only 2.7% core acid titratable. The dry density of this polymer was determined to be 0.6945 g/cc.

EXAMPLE 43

(Comparative) A 5-liter, four necked round bottom flask was equipped with paddle stirrer, thermometer, nitrogen inlet, and reflux condenser. Deionized water, 2000 grams, was added to the kettle and heated to 86° C. under a nitrogen atmosphere. To the heated kettle water was added 3.8 grams of sodium persulfate dissolved in 30 grams of deionized water. This was immediately followed by 195.4 grams of the core prepared in Example 15. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 3.0 grams/minute at a temperature of 80° C. Upon completion of ME I a second monomer emulsion (ME II) was prepared by mixing 190 grams of deionized water, 3.8 grams of SDS, and 720 grams of styrene. The ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of the reaction mixture was allowed to increase to 92° C. Upon completion of the ME II and co-feeds, 42 grams of ammonium hydroxide were added to the kettle and the batch was held at 92° C. for 5 minutes. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 25.5%, a pH of 10.2, and a particle size of 232 nm. An acid titration showed good core encapsulation with only 6.4% core acid titratable. The dry density of this polymer was determined to be 0.9115 g/cc.

EXAMPLE 44

(Comparative) A 5-liter, four necked round bottom flask was equipped with paddle stirrer, thermometer, nitrogen inlet, and reflux condenser. Deionized water, 2000 grams, was added to the kettle and heated to 86° C. under a nitrogen atmosphere. To the heated kettle water was added 3.8 grams of sodium persulfate dissolved in 30 grams of deionized water. This was immediately followed by 195.4 grams of the core prepared in Example 15. A monomer emulsion (ME I) was prepared by mixing 50 grams of deionized water, 3.0 grams of SDS, 10.8 grams of butyl methacrylate, 106.8 grams of methyl methacrylate, and 2.4 grams of methacrylic acid and was added to the kettle at a rate of 3.0 grams/minute at a temperature of 80° C. Upon completion of ME I a second monomer emulsion (ME II) was prepared by mixing 190 grams of deionized water, 3.8 grams of SDS, and 720 grams of styrene. The ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of the reaction mixture was allowed to increase to 92° C. When 777 grams of ME II had been added to the kettle, 42 grams of ammonium hydroxide were added to the kettle. Upon completion of the ME II and co-feeds, the batch was held at 920C for 5 minutes. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 25.2%, a pH of 10.2, and a particle size of 268 nm. An acid titration showed fair core encapsulation with 7.2% core acid titratable. The dry density of this polymer was determined to be 0.7688 g/cc.

EXAMPLE 45

A 5-liter, four necked round bottom flask was equipped with paddle stirrer, thermometer, nitrogen inlet, and reflux condenser. Deionized water, 2200 grams, was added to the kettle and heated to 86° C. under a nitrogen atmosphere. To the heated kettle water was added 3.8 grams of sodium persulfate dissolved in 30 grams of deionized water. This was immediately followed by 196.1 grams of the core prepared in Example 13. A monomer emulsion (ME I) was prepared by mixing 100 grams of deionized water, 6.0 grams of SDS, 21.6 grams of butyl methacrylate, 213.6 grams of methyl methacrylate, and 4.8 grams of methacrylic acid and was added to the kettle at a rate of 6.0 grams/minute at a temperature of 80° C. Upon completion of ME I a second monomer emulsion (ME II) was prepared by mixing 190 grams of deionized water, 3.8 grams of SDS, 720 grams of styrene, and 1.8 grams of allyl methacrylate. From ME II, 137 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.0 grams/minute. After 10 minutes the rate of ME II was increased to 25 grams/minute. The temperature of the reaction mixture was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the reaction mixture reached 85° C., the held back portion of ME II (91.4 grams) was added to the reactor followed by the addition of 42 grams of ammonium hydroxide. The reaction mixture was held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 25.6%, a pH of 10.1, and a particle size of 237 nm. An acid titration showed good core encapsulation with only 2.9% core acid titratable. The dry density of this polymer was determined to be 0.6868 g/cc.

EXAMPLE 46

(Comparative) A 5-liter, four necked round bottom flask was equipped with paddle stirrer, thermometer, nitrogen inlet, and reflux condenser. Deionized water, 2200 grams, was added to the kettle and heated to 86° C. under a nitrogen atmosphere. To the heated kettle water was added 3.8 grams of sodium persulfate dissolved in 30 grams of deionized water. This was immediately followed by 189.9 grams of the core prepared in Example 11. A monomer emulsion (ME I) was prepared by mixing 100 grams of deionized water, 6.0 grams of SDS, 21.6 grams of butyl methacrylate, 213.6 grams of methyl methacrylate, and 4.8 grams of methacrylic acid and was added to the kettle at a rate of 6.0 grams/minute at a temperature of 80° C. Upon completion of ME I a second monomer emulsion (ME II) was prepared by mixing 190 grams of deionized water, 3.8 grams of SDS (23%), and 720 grams of styrene. ME II was added to the kettle at a rate of 12.5 grams/minute and a mixture of 1.9 grams of sodium persulfate dissolved in 75 grams of deionized water was co-fed to the reactor at a rate of 2.0 grams/minute. After 10 minutes the rate of ME II was increased to 25 grams/minute. The temperature of the reaction mixture was allowed to increase to 92° C. When 822 grams of ME II had been added to the kettle, 42 grams of ammonium hydroxide were added to the contents of the kettle. Upon completion of the ME II and co-feeds the batch was held for 5 minutes at 92° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 26.1%, a pH of 10.2, and a particle size of 270 nm. An acid titration showed good core encapsulation with only 3.0% core acid titratable. The dry density of this polymer was determined to be 0.7746 g/cc.

EXAMPLE 47

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 191.5 grams of the core prepared in Example 16. A monomer emulsion (ME I) was prepared by mixing 50 grams of deionized water, 3.0 grams of SDS (23%),10.8 grams of butyl methacrylate, 106.8 grams of methyl methacrylate, and 2.4 grams of methacrylic acid and was added to the kettle at a rate of 3.0 grams/minute at a temperature of 80° C. Upon completion of ME I, a second monomer emulsion (ME II) was prepared by mixing 190 grams of deionized water, 3.8 grams of SDS (23%), and 720 grams of styrene. From ME II, 137 grams were removed and set aside. The initial portion of ME II was added to the kettle at a rate of 12.5 grams/minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of the batch was allowed to increase to 92° C. Upon completion of the ME II and co-feeds a mixture of 8 grams of 4-hydroxy TEMPO and 8 grams of deionized water was added to the kettle and the batch was cooled to 85° C. When the kettle temperature reached 85° C., the held back portion of ME II (137.0 grams) was added to the kettle followed by the addition of 42 grams of ammonium hydroxide. The kettle temperature was held at 85° C. for 5 minutes. After the 5 minute hold a mixture of 0.95 grams of sodium persulfate dissolved in 20 grams of deionized water was added to the kettle. The contents of the kettle were held for 30 minutes at 85° C. and then cooled to room temperature and filtered to remove any coagulum formed. The final latex had a solids content of 27.5%, a pH of 10.2, and a particle size of 385 nm. An acid titration showed good core encapsulation with only 4.0% core acid titratable. The dry density of this polymer was determined to be 0.6226 g/cc.

EXAMPLE 48

A 5-liter, four necked round bottom flask was equipped with paddle stirrer, thermometer, nitrogen inlet, and reflux condenser. Deionized water, 1700 grams, was added to the kettle and heated to 86° C. under a nitrogen atmosphere. To the heated kettle water was added 3.8 grams of sodium persulfate dissolved in 30 grams of deionized water. This was immediately followed by 271.5 grams of the core prepared in Example 4. A monomer emulsion (ME I) was prepared by mixing 50 grams of deionized water, 3.0 grams of SDS (23%),10.8 grams of butyl methacrylate, 106.8 grams of methyl methacrylate, and 2.4 grams of methacrylic acid and was added to the kettle at a rate of 4.5 grams/minute at a temperature of 80°. Upon completion of ME I a second monomer emulsion (ME II) was prepared by mixing 190 grams of deionized water, 3.8 grams of SDS (23%), and 720 grams of styrene. From ME II, 91.4 grams were removed and set aside. The initial portion of ME II was added to the kettle at a rate of 25 grams/minute and a mixture of 1.9 grams of sodium persulfate dissolved in 75 grams of deionized water was co-fed to the reactor at a rate of 2.5 grams/minute. The temperature of .the kettle is allowed to increase to 92° C. Upon completion of the ME II and co-feeds a mixture of 8 grams of 4-hydroxy TEMPO and 8 grams of deionized water was added to the kettle and the batch was cooled to 85° C. When the kettle temperature reached 85° C., the held back portion of ME II (91.4 grams) was added to the reactor followed by the addition of 42 grams of ammonium hydroxide. The contents of the reactor were held 5 minutes at 85° C. After the 5 minute hold a mixture of 0.95 grams of sodium persulfate dissolved in 20 grams of deionized water was added to the kettle. The reaction mixture was held for 30 minutes at 85° C. and then cooled to room temperature and filtered to remove any coagulum formed. The final latex had a solids content of 27.6%, a pH of 10.0, and a particle size of 525 nm. An acid titration showed good core encapsulation with only 4.4% core acid titratable. The dry density of this polymer was determined to be 0.5979 g/cc.

EXAMPLE 49

A 5-liter, four necked round bottom flask was equipped with paddle stirrer, thermometer, nitrogen inlet, and reflux condenser. Deionized water, 2000 grams, was added to the kettle and heated to 86° C. under a nitrogen atmosphere. To the heated kettle water was added 3.8 grams of sodium persulfate dissolved in 30 grams of deionized water. This was immediately followed by 188.0 grams of the core prepared in Example 8. A monomer emulsion (ME I) was prepared by mixing 50 grams of deionized water, 3.0 grams of SDS, 12.0 grams of butyl methacrylate, 105.6 grams of methyl methacrylate, and 2.4 grams of methacrylic acid and was added to the kettle at a rate of 3.0 grams/minute at a temperature of 80° C. Upon completion of ME I a second monomer emulsion (ME II) was prepared by mixing 136 grams of deionized water, 2.7 grams of SDS, 406.5 grams of styrene, 102 grams of acrylonitrile, and 1.5 grams of allyl methacrylate. A third monomer emulsion (ME III) was prepared by mixing 24 grams of deionized water, 0.5 grams of SDS, 0.2 grams of allyl methacrylate, and 90 grams of styrene. The initial portion of ME II was added to the kettle at a rate of 12.5 grams/ minute and a mixture of 1.9 grams of sodium persulfate dissolved in 75 grams of deionized water was co-fed to the reactor at a rate of 2.5 grams/minute. After 10 minutes the rate of ME II was increased to 25 grams/minute. The temperature of the kettle was allowed to increase to 92° C. Upon completion of the ME II and co-feeds a mixture of 8 grams of 4-hydroxy TEMPO and 8 grams of deionized water was added to the reaction mixture and the batch was cooled to 85° C. When the temperature of the kettle reached 85° C., ME III was added to the reactor followed by the addition of 38 grams of ammonium hydroxide. The reaction mixture was held 5 minutes at 85° C. After the 5 minute hold a mixture of 0.95 grams of sodium persulfate dissolved in 20 grams of deionized water was added to the kettle. The kettle was held for 30 minutes at 85° C. and then cooled to room temperature and filtered to remove any coagulum formed. The final latex had a solids content of 22.5%, a pH of 10.1, and a particle size of 906 nm. An acid titration showed good core encapsulation with only 2.0% core acid titratable. The dry density of this polymer was determined to be 0.4539 g/cc.

We claim:

1. A process for preparing emulsion polymer particles comprising:
   (a) providing an aqueous emulsion of
      (i) multi-stage emulsion polymer, comprising a core stage polymer and a shell stage polymer,
         wherein the core stage polymer comprises, as polymerized units, from 5 to 100 percent by weight, based on the weight of the core stage polymer, of hydrophilic monoethylenically unsaturated monomer, and from 0 to 95 percent by weight, based on the weight of the core stage polymer, of at least one nonionic monoethylenically unsaturated monomer; and wherein the shell stage polymer comprises, as polymerized units, at least 50 percent by weight of nonionic monoethylenically unsaturated monomer;

(ii) monomer at a level of at least 0.5 percent by weight based on the weight of the multi-stage emulsion polymer; and (iii) swelling agent under conditions wherein there is no substantial polymerization of the monomer; and (b) reducing the level of monomer by at least fifty percent.

2. The process of claim 1 wherein the monomer at a level of at least 0.5 percent by weight based on the weight of the multi-stage emulsion polymer is one or more of the monomers used to prepare the multi-stage emulsion polymer.

3. The process of claim 1 wherein the monomer at a level of at least 0.5 percent by weight based on the weight of the multi-stage emulsion polymer is nonionic monomer.

4. The process of claim 1 wherein the swelling agent is selected from volatile base, fixed base, and combinations thereof.

5. The process of claim 1 wherein the level of monomer is reduced to less than 10,000 ppm based on polymer solids by polymerizing said monomer.

* * * * *